(12) United States Patent
Dunnihoo

(10) Patent No.: US 6,661,122 B1
(45) Date of Patent: Dec. 9, 2003

(54) POLARITY INDEPENDENT POWER SUPPLY CONTROL METHODS AND SYSTEMS USING THE SAME

(75) Inventor: Jeffrey Dunnihoo, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 45 days.

(21) Appl. No.: 10/020,142

(22) Filed: Dec. 7, 2001

(51) Int. Cl.$^7$ .................................................. H02B 1/24
(52) U.S. Cl. ...................................... 307/127; 307/138
(58) Field of Search ............................. 307/64, 38, 80, 307/127, 138

(56) References Cited

U.S. PATENT DOCUMENTS

2002/0149263 A1 * 10/2002 Blanco et al. ................. 307/64

\* cited by examiner

Primary Examiner—Brian Sircus
Assistant Examiner—Robert L. DeBeradinis
(74) Attorney, Agent, or Firm—James J. Murphy, Esq.; Winstead Sechrest & Minick

(57) ABSTRACT

A method of controlling a power supply having an output activated in response to a first logic level of a control signal and deactivated in response to a second logic level of the control signal. A clock is generated on a second power source and used to time a time-out period of a selected number of clock periods. In response to the step of sensing, if the state of the output of the power supply is inactive through the timeout period, then the first logic level of the control signal is generated to activate the power supply for use in powering operations of an associated device. After completion of these operations, the second logic level of the control signal is generated to deactivate the power supply. If however, the state of the output of the power supply is active during the time-out period, then the first logic level of the control signal is maintained to power operations of the associated device. At the end of these operations, the second logic level of the control signal is generated to deactivate the power supply.

19 Claims, 3 Drawing Sheets

POLARITY INDEPENDENT POWER SUPPLY CONTROL METHODS AND SYSTEMS USING THE SAME

BACKGROUND OF THE INVENTION

1. Field of the Invention

The present invention relates in general to integrated circuits and in particular to polarity independent power supply control methods and systems using the same.

2. Description of the Related Art

Sophisticated design and fabrication techniques are rapidly making practical systems-on-a-chip a reality. In turn, a broad range of personal and commercial hand-held appliances can be constructed which embody a high degree of functionality. These appliances include personal digital assistants, personal digital music players, compact computers, point of sale devices, and Internet access devices, to name only a few of the possibilities.

A number of factors must be addressed when designing a system-on-a-chip. Among other things, the device must be capable of interfacing with a broad range of input/output devices which may be required to support various potential user-defined applications. Moreover, the device must be power efficient while operating at high clock speeds. Additionally, the device should have a large address space to flexibly support a range of possible memory configurations and sizes.

SUMMARY OF INVENTION

The principles of the present invention are embodied in methods and circuits for controlling power supplies of differing control input polarities. According to one embodiment, a method is disclosed of controlling a power supply having an output activated in response to a first logic level of a control signal and deactivated in response to a second logic level of the control signal. A clock is generated on a second power source and used to time a time-out period of a selected number of clock periods. The state of the output of the power supply is sensed during the time out period. If the state of the output of the power supply is inactive through the timeout period, the first logic level of the control signal is generated to activate the power supply for powering operations of an associated device. At the completion of these operations, the second logic level of the control signal is generated to deactivate the power supply. If the state of the output of the power supply is active during the time-out period, the first logic level of the control signal is maintained while operations of the associated device are powered. At the completion of these operations, the second logic level of the control signal is generated to deactivate the power supply.

Circuits, systems and methods embodying the principles of the present invention have substantial advantages. Among other things, they allow a power supply or similar circuit operating in response to a control signal of arbitrary polarity to be compatible with the associated functional circuitry. Moreover, only a single pin or terminal is required to implement power supply control in the case of an external power supply. Also, no preprogramming or pin strapping is required.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
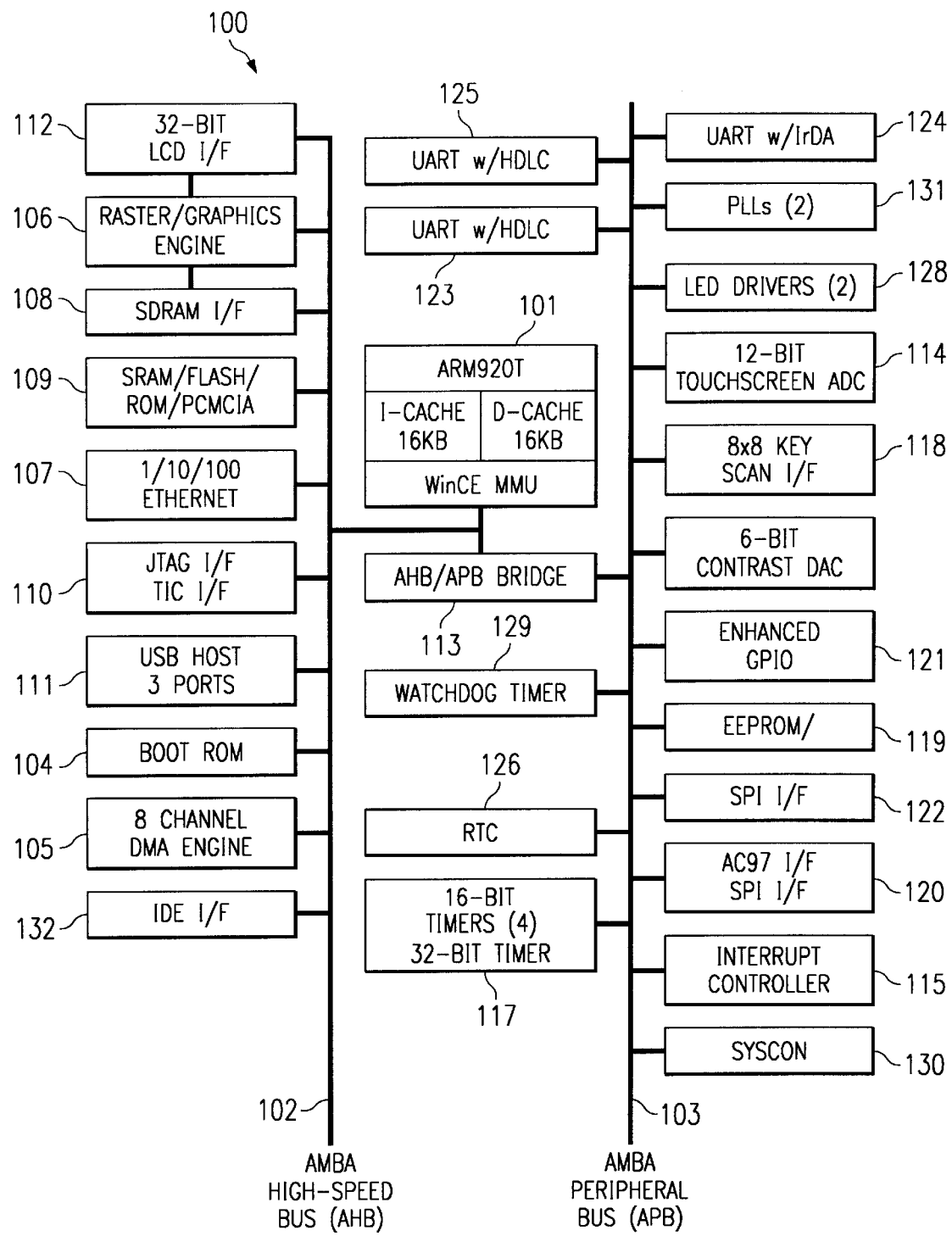
FIG. 1 is a diagram of a microprocessor-based system-on-a-chip embodying the principles of the present invention.
Figure 2:
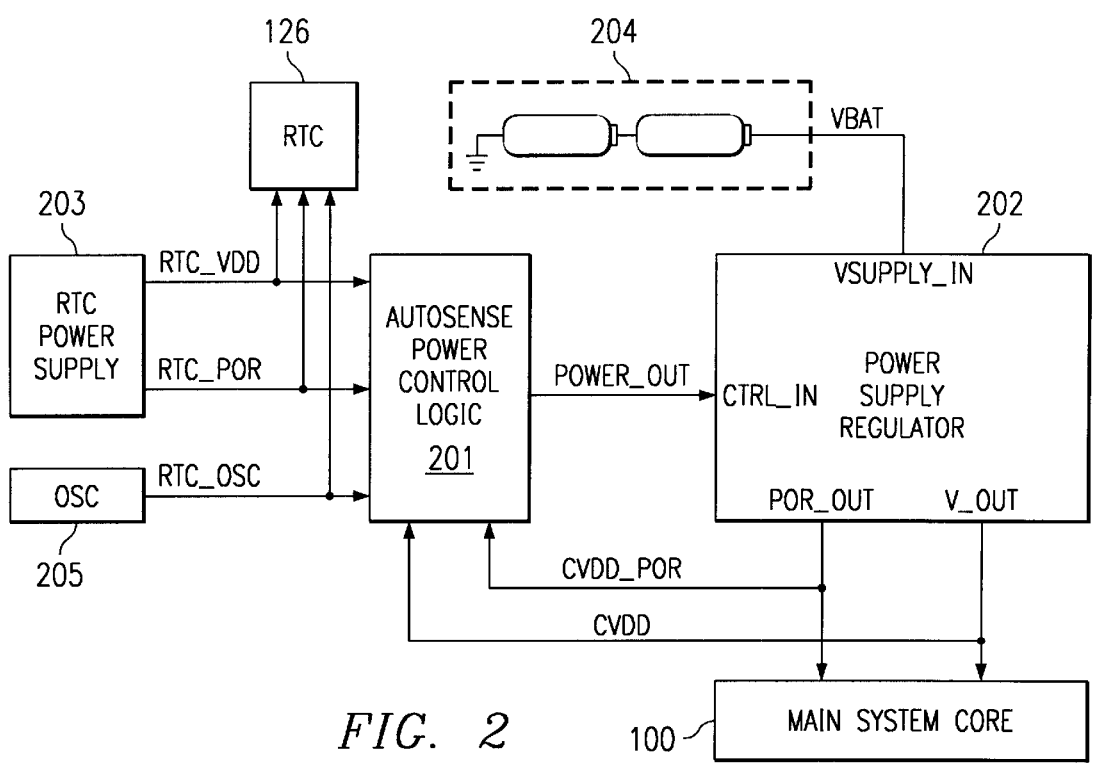
FIG. 2 is a functional block diagram illustrating power control circuitry suitable for use in system and similar applications.

The principles of the present invention and their advantages are best understood by referring to the illustrated embodiment depicted in FIGS. 1–3 of the drawings, in which like numbers designate like parts.

FIG. 1 is a diagram of a microprocessor-based system-on-a-chip 100 embodying the principles of the present invention. System 100 is a general purpose processing device suitable for use in a number of high performance personal and commercial information processing systems requiring small device size and low power consumption. Among other things, system 100 may be embodied in personal portable appliances, such as handheld music players, portable Internet appliances and personal digital assistants, commercial portable appliances such as portable point-of-sale terminals, as well as intelligent peripherals, telecommunications appliances and compact computers.

In the preferred embodiment, system 100 is based on an ARM 920T microprocessor core 101 operating in conjunction with a, set of on-chip peripheral devices via an AMBA High Speed Bus (AHB or peripheral bus high speed bus) 102 and an AMBA Advanced Peripheral Bus (APB) 103. The peripheral set will be discussed further below. Specific details of microprocessor core are set out in the ARM920T data sheet available from ARM, Ltd., Cambridge, United Kingdom, incorporated herein by reference. Additionally, detailed specifications for AHB 102 and APB 103 are also available from ARM, Ltd., such specifications also incorporated herein by reference.

System boot ROM 104 operates from high speed bus 101 and controls the selection of the external source of program code from which system 100 operates. In the preferred embodiment, boot ROM 101 comprises 16 KBytes of mask-programmed memory.

A multiple-channel Direct Memory Access (DMA) engine 105 also operates off high speed bus 102 and services requests for memory access by various requesting blocks such as the UARTs discussed below.

The graphics engine of raster/graphics engine block 106 generally offloads graphics processing tasks from processor core 101, operating off high speed bus 102 as either the bus master or as a register slave. The raster engine portion of raster/graphics engine 106 drives analog CRTs or digital LCDs, including non-interlaced flat panel and dual scanning devices. It can also support an optional interface to an NTSC encoder.

An ethernet MAC 107 is also provided on AMBA bus 102 and supports communications with external devices in accordance with the Ethernet/ISO/IEC 8802-3 protocol.

SDRAM interface 108, operating off AHB 102, is preferably based on an ARM PL090 SDRAM controller and a set of associated configuration registers. The SRAM interface block 109 is preferably based on an ARM PL090 Static Memory Controller. Block 109 additionally includes a slave-only V2.1 compliant PCMCIA PCCard Interface operating off high speed bus 102.

JTAG/TIC interface 110 supports testing in compliance with IEEE Std. 1149.1–1990, Standard Test Port and Boundary Scan Architecture.

USB Controller 111 is preferably configured for three root hub ports and an integrated transceiver and complies with the Open Host Controller Interface Specification for USB, Revision 1.0.

LCD DAC interface 112 provides an analog DC voltage for driving LCD contrast controls, preferably generated from a resistor ladder. The DAC preferably is a 64-step digital to analog converter.

Bridge 113 interfaces high speed bus 102 with the relatively slower AMBA Peripheral Bus (APB) 103. Bridge 113 is a slave on high speed bus 102 and the only master on peripheral bus 103, driving addresses, data and control signals during peripheral accesses.

Analog touch screen interface 114 performs hardware scanning for 4-, 5-, 7-, and 8-wire analog resistive touch screens. A compatible interrupt controller 115 also operates off of peripheral bus 103 and can handle up to 64 interrupts. Timer block 117 includes four 16-bit and two 32-bit interval timers, and a 40-bit time stamp debug timer.

System 100 includes keyboard matrix scan circuitry 118 operating from peripheral bus 103. In the preferred embodiment, a key array of up to 64 keys in 8 rows and 8 columns is supported, with any one or two keys debounced and decoded at one time.

EEPROM/I2C interface 119 supports a connection to an external EEPROM for inputting configuration information on system power-up. Alternatively, this interface can also be used as a generic I2C Port. LED interface 128 provides a dedicated control for driving 2 LED indicators.

An AC97/Inter—IC Sound (I2S) interface 120 is provided on peripheral bus 102 in the preferred embodiment of system . A on-chip multiplexer allows the user to select between a connection to an external AC97 codec or an external I2S bus In addition to the standard GPIO functions, GPIO block 121 in system 100 includes enhanced capability. In particular, interrupts have been added to each of the GPIO pins, along with registers for enabling and masking the interrupts, status and test control registers. SPI interface (Synchronous Serial Interface) 122 can be used to communicate with an external analog to digital converter and/or digitizer.

System 100 includes three of universal asynchronous receive-transmit (UART) interfaces 123–125. These asynchronous ports can be used, for example, to communicate with external RS-232 transceivers generally similar to that of industry standard 16C550 UART devices.

Real time clock (RTC) with Trim 126 allows software controlled digital compensation of a 32.768 KHz crystal oscillator. The oscillator can be electronically calibrated by automatic test equipment during manufacture and then adjusted in the field.

Watchdog timer circuitry 129 is based on a 7-bit counter, the most significant bit of which is used to trigger the generation of a Watchdog Reset signal. To keep the reset pulse from occurring, software must "kick the dog" on a periodic basis by resetting the counter and preventing the MSB from activating.

System control block 130 generally controls such central functions as hardware test mode, clock control, power management and system configuration management.

System 100 includes two phase-locked loops (PLLs) 131 which generate the clocks and similar timing signals necessary during device operation.

IDE interface 132 operates from high speed bus 102 and supports ATAPI compliant connections to both external master and slave IDE devices,.

In the preferred embodiment, all blocks or subsystems 101–132 of system 100 are fabricated on a single integrated circuit chip. This can be accomplished for example using a 0.25 µm, four layer metal process, although other processes known in the art can also be used. In the illustrated embodiment, processor core 101 operates from a 2.5V nominal supply, although this may be reduced in alternate embodiments. The peripherals in the illustrated embodiment operate from a 3.3V supply. In this embodiment, the nominal clock speed for processor core 101 is 200 MHz.

System 100 preferably operates from a battery and an associated power supply chip. To insure maximum flexibility, system 100 should be capable of interfacing with a wide range of power supply designs. To do so, the polarity of the control signals necessary to control the functioning of the power supply must be considered. For example, the output of some power supply chips or designs are enabled in response to a logic high active signal, while those of other chips and designs are enabled with a logic low active signal.

The principles of the present invention provide for polarity independent control of an external power supply. Preferably, external power supply control is performed through a selected (and preferably dedicated) one of GPIO pins 121.

FIG. 2 is a functional block diagram illustrating power control circuitry 200 suitable for use in system 100 and similar applications. Power control circuitry 200 is based on Autosense Power Control Logic 201 which will be discussed in further detail in connection with the timing diagrams of FIGS. 3A and 3B. Also forming a part of power control circuitry 200 are a core power supply 202 and on-chip RTC (stand-by) power supply 203 powering RTC 126 and its associated oscillator 205. Power supplies 202 and 203 are in turn powered by an external battery or batteries 204.

Figure 3A:
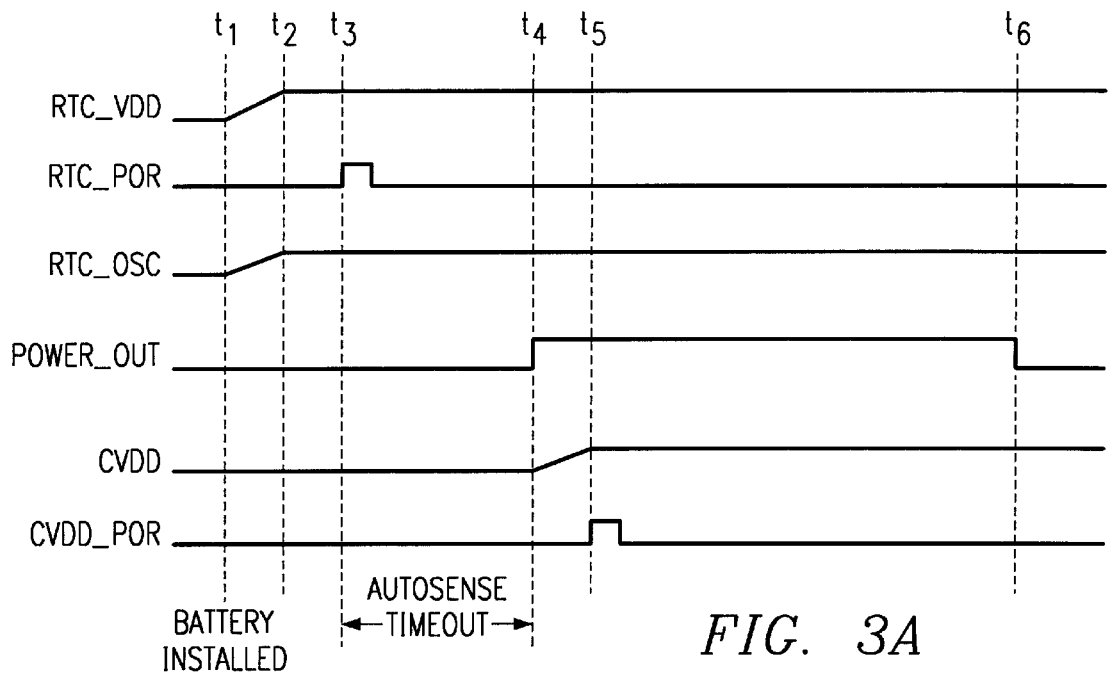
FIG. 3A illustrates auto-sensing sequence for the case where power supply regulator activates in response to an active high Power_OUT.
Figure 3B:
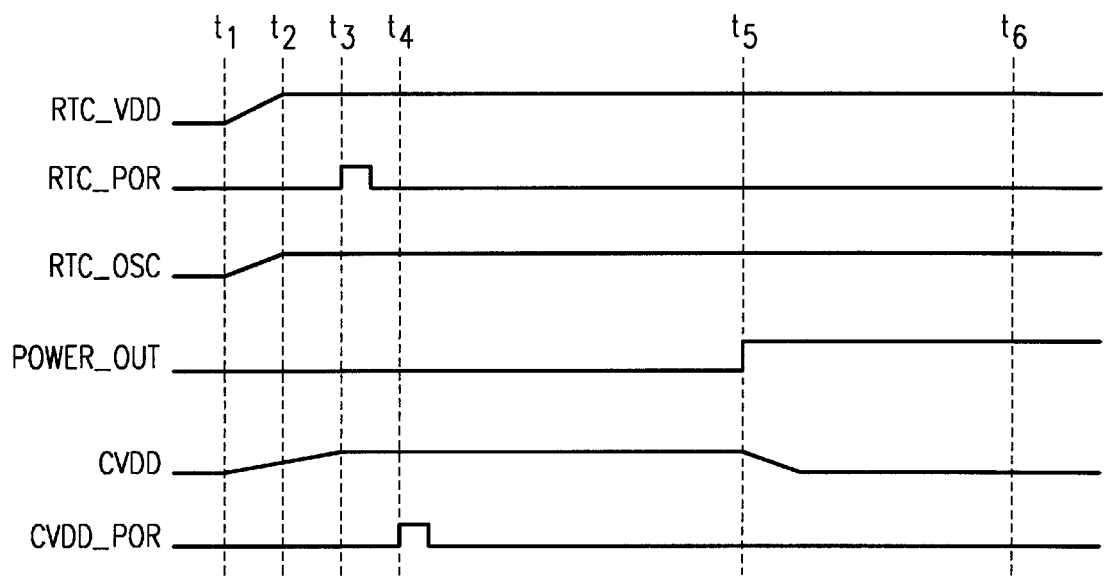
FIG. 3B illustrates the analogous case: where power supply turns on the core power CVDD in response to an active low state of Power_OUT.

Table 1 describes the functions corresponding to the signal names used in FIGS. 2, 3A and 3B:

| | |
|---|---|
| RTC_VDD | Standby Power Supply - Powers RTC and Oscillator |
| RTC_POR | Power On Reset Signal indicating RTC VDD valid |
| RTC_OSC | RTC Oscillator output |
| CVDD | Core Power Supply - powers minimum boot operations of system firmware |
| CVDD_POR | Power On Reset indicating CVDD valid |
| Power_OUT | Control signal for core power supply On/Off operation |
| VBAT | Battery voltage |

FIG. 3A illustrates auto-sensing sequence for the case where power supply regulator 202 activates in response to an active high Power_OUT.

At time $t_1$, the battery power VBAT is applied to system 100. As RTC_VDD ramps-up to its specification value at time $t_2$, the RTC_OSC output correspondingly ramps-up towards its final peak to peak value. Once RTC_VDD and RTC_OSC stabilize at time $t_3$, RTC_POR is generated to reset RTC 126 and the system 100 logic in general. The AutoSense time-out countdown is also initiated at time $t_3$.

Since power supply 202 turns-on in response to active high Power_Out, CVDD remains in an inactive (off) state In the illustrated embodiment, the time-out countdown period between times $t_3$ and $_4$ is 250 ms, although this number may vary from application to application. Whatever the timeout period selected, if CVDD is not detected before time $t_4$, AutoSense logic 201 latches Power_OUT to an active high state to allow power supply 202 to turn-on. Power supply 202 generates $CVDD_{13}POR$ when CVDD is ready such that the system software (firmware) can begin to configure system 100.

After a given amount of time for configuring system 100 desired wake-up events, the system software sets Power_OUT to an active low state. Power supply 202 consequently turns-off the power supply to the main system core 101 until a specified wake-up event occurs and is detected by software. As long as VBAT remains active, RTC_VDD is maintained as standby power and RTC_OSC continues to tick.

FIG. 3B illustrates the analogous case where power supply 202 turns on the core power CVDD in response to an active low state of Power_OUT. As with the sequence shown in FIG. 3A, the RTC power and oscillator output ramp-up up between times $t_1$ and $t_3$. In this case however, since Power_OUT begins in a logic low state, CVDD starts to ramp-up beginning a time $t_1$.

At time $t_3$, RTC_POR is generated indicating that the standby power RTC_VDD and the oscillator output RTC_OSC are stable. The AutoSense timeout countdown period also begins.

Once CVDD has settled at its full voltage, $CVDD_{13}$ POR is generated by power supply 202 at time $t_4$, before the end of the AutoSense countdown period. $Power_{13}$ OUT is latched in the active low state. Software then configures system 100 to respond to selected wake-up events.

Once configuration is completed at time $t_5$, software causes Power_OUT to transition to an inactive high state such that power supply 202 turns-off CVDD. System 100 waits for a wake-up event at time $t_6$, with standby power RTC_VDD and the oscillator output RTC_OSC remaining active.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method of controlling a power supply in system operating in response to an oscillator and first and second power supplies comprising the steps of:

coupling the system to a power source;

powering the oscillator with the first power supply;

allowing an oscillator output to stabilize;

initiating a time-out period timed by a clock generated from the oscillator output;

sensing a state of an output of-the second power supply during the time-out period; and if the state of the output of the second power supply is in an inactive state after the time-out period, activating the second power supply.

2. The method of claim 1 and further comprising the steps of:

configuring of the system; and after completing said step of configuring, deactivating the second power supply.

3. The method of claim 1 wherein if the state of the output of the second power supply is active during the time-out period, performing the steps of:

configuring the system; and after completing said step of configuring, deactivating the second power supply.

4. The method of claim 1 wherein said step of initiating a time period comprises the substep of detecting reset signal generated when a output of the first power supply is valid.

5. The method of claim 1 wherein said step of activating the second power supply comprises the substeps of generating an active high control signal and transmitting the active high control signal to the second power supply.

6. The method of claim 3 wherein said step of deactivating the second power supply comprises the step of generating an inactive high control signal and transmitting the inactive high control signal to the second power supply.

7. A method of controlling a power supply having an output activated in response to a first logic level of a control signal and deactivated in response to a second logic level of the control signal comprising the steps of:

generating a clock from a second power source;

initiating a time-out period of a selected number of periods of the clock;

sensing a state of the output of the power supply during the time-out period;

in response to said step of sensing, if the state of the output of the power supply is inactive through the time-out period performing the steps of:

generating the first logic level of the control signal to activate the power supply;

powering operations of an associated device with the power supply; and at the completion of said step of powering operations of the associated device, generating the second logic level of the control signal to deactivate the power supply; and in response to said step of sensing, if the state of the output of the power supply is active during the time-out period performing the steps of:

maintaining the first logic level of the control signal;

powering the operations of the associated device with the power supply; and at the completion of said step of powering operations of the associated device, generating the second logic level of the control signal to deactivate the power supply.

8. The method of claim 7 wherein the first logic level is a logic high level and the second logic level is a logic low level.

9. The method of claim 7 wherein the first logic level is a logic low level and the second logic level is a logic high level.

10. The method of claim 7 wherein said step of generating a clock comprises the steps of:
applying power to the second power supply;
starting-up an oscillator driving a clock generator; and
when the oscillator has stabilized, generating the clock.

11. The method of clam 7 wherein said operations of the associated device comprise configuration operations.

12. The method of claim 7 and further comprising the step of coupling the power supply to a battery prior to said step of sensing.

13. A system comprising:
functional circuitry;
an oscillator for generating timing signals for controlling said functional circuitry;
a first power supply for powering said oscillator;
a second power supply for powering said functional circuitry and having an output activated and deactivated by respective first and second logic states of a control signal; and
autosense logic for generating said control signal and operable to:
allow the oscillator to stabilize;
initiate a time-out period timed by a clock generated from the oscillator output;
sense a state of an output of the second power supply during the time-out period;
if the state of the output of the second power supply is in an inactive state after the time-out period, generate the first logic state of the control signal; and
if the state of the output of the second power supply is active during the time-out period, maintaining the first logic state of the control signal.

14. The system of claim 13 wherein said functional circuitry comprises a system on a chip.

15. The system of claim 13 wherein said second power supply is external to a chip comprising said functional circuitry.

16. The system of claim 13 and further comprising a battery for powering at least one of said first and second power supplies.

17. The system of claim 13 wherein said functional circuitry is further operable in response to software to:
configure said system for wake-up events while said control signal is in the first logic state; and
transition the control signal to the second logic state following system configuration.

18. The system of claim 13 wherein said clock is generated by a real time clock driven by said oscillator.

19. The system of claim 13 wherein said autosense logic and said functional logic are integrated together on a single chip.

* * * * *